United States Patent Office 3,303,032
Patented Feb. 7, 1967

3,303,032
MAGNESIA-ZIRCON REFRACTORIES
John P. Holt, Ladue, and Theodore Paul Cash, Bonne Terre, Mo., assignors to Valley Dolomite Corporation, St. Louis, Mo., a corporation of Missouri
No Drawing. Filed May 27, 1964, Ser. No. 370,677
14 Claims. (Cl. 106—57)

This invention relates to refractory compositions, and particularly to refractory compositions comprising mixtures of dead-burned magnesite, dolomite, and other basic oxides and combinations thereof, of particle size of U.S. 70 mesh or larger, and zircon of U.S. 50 mesh and smaller. Minor amounts of various bonding or fluxing agents may also be present in the composition and under certain circumstances, a few percentage points of minus 70 mesh magnesite or other basic oxide or hydroxide may be found advantageous.

One of the principal objects of the present invention is to provide a refractory composition including approximately 40–90% basic refractory grains of larger than U.S. 70 mesh, and zircon grains of smaller than U.S. 50 mesh plus minor amounts of binding agents, etc.

Another object of this invention is to provide a refractory composition containing zircon and a basic oxide which is highly resistant to thermal spalling.

Another object of the present invention is to provide a composition containing zircon which is suitable for use with hot and molten basic slags, and has high crush and flexure strength when cold.

Still another object is to provide a refractory composition of large size basic refractory grains and small zircon grains which has good gunning and casting properties, high resistance to thermal spalling, high abrasion resistance, and good hot load strength.

A further object is to provide a refractory containing basic grains and zircon grains which has a uniform coefficient of thermal expansion.

Still another object of the present invention is to provide a refractory which has varied uses, such as in basic hearth construction and repair, in gun repairs to hot brickwork, in lining runners and spouts of metallurgical furnaces, in constructing linings for ladles on vessels used to contain molten steel, to form linings for reaction vessels employed in the manufacture of ferro-alloys, in lining or "piping" tap holes in steel making furnaces, lining high frequency induction furnaces, and for constructing tubes for use in piping molten steel in vacuum degassing processes and pressure casting processes.

Another object is to provide a refractory containing basic grains and zircon grains which develops sufficient "temporary" liquid at temperatures in the neighborhood of 2000 to 2500° F. to sinter grains together, such liquids on further reaction, forming end products of very high melting point, these melting points being far above the melting point of the "temporary" liquid which sintered the grains together.

Another object is to provide a refractory whose final composition after prolonged firing consists of a mixture of stabilized (cubic) zirconia (melting point about 4700° F.), forsterite (melting point about 3400° F.), or other high melting basic silicate such as $2CaO \cdot SiO_2$, and periclase (melting point about 5100° F.) or other high melting basic oxide such as CaO, such refractory being useful to line vessels which contain molten metals and slags, solids and gases at high temperatures.

Another object is to provide a granular refractory which may be cast, gunned, pressed or rammed in place or into brick or shapes; such refractory developing strength by (1) air drying (2) by sintering as a result of liquid formation at temperatures in the neighborhood of 2000 to 2500° F. or at higher temperatures, and to decompose this liquid to form a mixture of compounds of very high melting points.

Another object is to provide a refractory whose permanent change in volume after firing may be controlled so as to produce a matured body whose volume is less than, equal to or greater than the original pressed, cast, gunned or rammed volume.

Another object is to provide a basic refractory which may be stored in a moistened condition, ready for immediate use, upon opening its container, such basic refractory's rammed and dried strength not being seriously impaired by such wet storage.

These and other advantages will become apparent hereinafter.

Magnesia and dolomite refractories and mixtures thereof, alone and in combination with other basic refractory constituents such as chromite, are relatively inexpensive and have been available for many years. Likewise, zircon refractories combined with acid refractory constituents, such as silica, ganister, or fireclays, have been manufactured for some time. Generally, basic refractories containing magnesite, dolomite and/or chromite, contain magnesite as a fine fraction, a substantial amount of such a fine fraction being necessary to achieve high density in service. Although it is well known that a combination of coarse and finely comminuted (such as minus U.S. 70 mesh) magnesite in a refractory offers good resistance to attack from molten basic slag as compared to most acid refractories grains so comminuted, in slag penetration tests, we find that a combination of coarse and finely comminuted zircon has equal resistance to such slags.

In our slag penetration tests, we prepare various formulations of magnesite; magnesite and zircon; zircon; and ganister and zircon; to which less than 12% of appropriate bonding chemicals are admixed. These formulations are intimately mixed and then tempered with 3 to 5% by weight of water and pressed into bricks. The bricks are dried at 265° F. to produce initial strength. After drying, each brick is cut in two transversely to provide duplicate samples. A 2⅛" diameter x 1" deep hole is drilled in one of the large faces of each half. The holes in each of these pairs are filled with equal weights of one of three finely ground basic slags: (a) open hearth finishing slag from a low carbon heat; (b) electric furnace reducing slag; (c) slag formed in the process of making low carbon ferro-manganese. The samples are placed in a furnace and brought up to temperatures of 2900° F. for the open hearth and ferro-manganese slags and to 3050° F. for the electric furnace reducing slag, which temperatures are high enough to melt the slags. The samples are held at these temperatures for five hours, and then are cooled. The samples which have not disintegrated are sectioned vertically through the center of the aforementioned 2⅛" diameter hole and the exposed cross sections of each brick are examined. Slag penetration is thus clearly visible. The vertical and horizontal penetration is measured in millimeters and averages of duplicate or comparable values are reported in Table I.

TABLE I

| Ex. No. | Refractory Composition Exclusive of Bonds | Slag Type | Slag Penetration | |
|---|---|---|---|---|
| | | | Horizontal (mm.) | Vertical (mm.) |
| 1 | 60.7% magnesite, 32% zircon | A | 3.0 | 16.0 |
| | | B | 1.9 | 8.5 |
| | | C | 0.0 | 13.0 |
| 2 | 60.0% ganister, 33.4% zircon | A | (¹) | (¹) |
| | | B | (¹) | (¹) |
| | | C | (¹) | (¹) |
| 3 | 93.4% zircon | A | 7.3 | 8.5 |
| | | B | 1.7 | 3.5 |
| | | C | 5.7 | 9.5 |
| 4 | 97.0% magnesite | A | (²) | 29.0 |
| | | B | 0.9 | 9.8 |
| | | C | 0.0 | 10.0 |

¹ All bricks disintegrated.
² Too irreg. to meas.

As those experienced in the art will recognize, slag penetration tests of this type are subject to varied interpretation, and it is not always satisfactory to attempt to assign quantitative values to such tests. The significance of Table I is that it indicates refractories containing only zircon or zircon plus magnesite are resistant to basic slags at high temperatures whereas refractories containing ganister (a refractory which is substantially all $SiO_2$ and which is sometimes used as the coarse fraction of zircon containing refractories) is not. Heretofore, it has generally been assumed that zircon (zirconium silicate, $ZrO_2 \cdot SiO_2$) would exhibit strong acid reactions when exposed to chemically basic pyrometallurgical environments because of its large (32%) $SiO_2$ content. It was thought that such reactions would be particularly rapid and destructive when the zircon was present as a finely comminuted form (all passing U.S. 50 mesh) as in Examples 1, 2 and 3 of Table I. We have unexpectedly found that finely comminuted zircon is relatively unreactive, and compares favorably to a refractory made almost entirely from a high purity magnesite, as shown by the examples in Table I.

It has been well known in the art for many years that great improvement of thermal shock resistance may be imparted to a refractory body if a substantial amount of strong aggregate or "grog" is incorporated in the mix prior to forming into a brick or refractory body of other shape. Likewise, porosity may be lowered if the grog used is low in porosity. Zircon, except in its gem form which is far too costly to be considered as a constituent of a refractory for general use, is available only as a rather fine sand or comminuted sand. Almost without exception, the present world supplies consist of sand whose largest particles will pass a 50 mesh sieve. Attempts at agglomerating zircon have ben costly or have resulted in agglomerates which are no stronger and no less porous than bodies made from graded zircon sand and milled zircon, bonded with ordinary bonding chemicals or sintering agents. Such agglomerates are useful in refractories designed to be emplaced by certain types of pneumatic equipment where their presence among the fine sand particles helps to prevent clogging of the passageways and hoses through which the refractory is blown. However, when these agglomerates are used to make bricks or other refractory shapes, they lose their identity in the matrix of similar strength and porosity and thus do not impart extra strength or thermal or mechanical shock resistance to the refractory body.

We have found that incorporation of approximately 40-90% of dead-burned magnesite, whose smaller particles are retained on a 70 mesh screen, into our zircon refractories increases the spall resistance appreciably. Our tests of comparative spall resistance are made by forming tubes 6" O.D. x 3" I.D. x 6" long of refractory bonded with equal amounts of the same bonding chemicals by ramming, pressing or casting procedures. These are heated to 1800° F. in a furnace and held until the temperature is essentially uniform throughout the specimens. The specimens are then removed from the furnace, set on a smooth layer of sand with their axes vertical and each filled with molten steel whose temperature is approximately 3000° F. During and after this procedure, the specimens are observed for the formation of cracks. In all cases, the specimens containing substantial amounts of relatively coarse magnesite (typical specimens are made with 40, 50 or 60% magnesite of 6 x 20 mesh plus minus 70 mesh zircon plus 3% sodium silicate) exhibit only minor cracks in this drastic test, whereas the specimens which contain no coarse magnesite virtually disintegrate.

These laboratory test results have been corroborated in the field where ladles, furnace spouts, high frequency induction furnaces have been lined with similar refractories. Sloughing off, spalling and cracking have been drastically reduced as compared to refractories made from zircon sand with or without finely comminuted other refractory substances. Lining life has been increased substantially and the possibility of entrapping refractory in the metal decreased accordingly.

We have also found that our coarse magnesite plus fine zircon refractories have better spall resistance and strength than do similar refractories made from magnesite alone. We have also found that slag and molten metals, such as steel, do not appear to wet this refractory as readily as they do basic refractories made from lime and/or magnesia alone. Consequently, furnaces and ladles drain clean. Slags containing iron oxide do not adhere strongly as they do to magnesite, dolomite or lime refractory linings. There is a lessened need to chip slag away to maintain full furnace or ladle capacity and such slag removal, when necessary, is much less time consuming. Many investigators have noticed that the bond between iron-bearing slags which have been allowed to cool from a molten state in contact with a magnesite, dolomite or lime refractory, is generally considerably stronger at normal temperatures than the bond within the refractory itself. Consequently, even careful attempts to remove the slag usually result in removing a substantial amount of the base refractory as well. This is a major cause of wear to basic linings of ladles, spouts and runners. This condition does not obtain to any serious extent in the cases of linings made of our magnesia and zircon mixes.

In order to explain the formation of high temperature bonds in our basic oxide-zircon refractory, we submit the following data on three sets of refractory mixes, one set of each, made from zircon, magnesite, and magnesia-zircon; all bonded with about three (3%) percent of a soluble sodium silicate and all three sets tempered with appropriate amounts of water. These tempered refractory mixes were pressed into bricks and dried at about 265° F. for five hours to develop initial strength. The three sets of bricks were then subjected to hot load test procedures according to ASTM designation C-16-49.

The zircon bricks failed at 1650° F., the softening point of the sodium silicate binder used.

The magnesite bricks failed at 2400° F., at approximately the softening point of some lime-magnesia silicates which formed in the refractory during the heating-up cycle.

The magnesia-zircon bricks failed at 2192° F. Examination of the bricks showed that an unidentified liquid had formed and solidified.

It is well known that, if a refractory brick is fired to high temperatures and then, after cooling, subjected to a hot load test, greater hot strength will be developed in such a pre-fired refractory than in one which was not pre-fired. However, failure in a hot load test such as ASTM C–16–49 occurs at a temperature which is below the maximum temperature to which the brick was pre-fired. This is because liquids which form on firing tend to react with solid matter present to form higher melting compounds with melting points approximately equal to the pre-firing temperature. When a refractory brick is subjected to a load and fired to progressively higher temperatures (as in ASTM C–16–49) failure occurs as the temperature approaches the temperature at which the brick was pre-fired because the liquids re-form, thus weakening the specimen which fails under load. This is generally true of many types of refractories and it is a very common procedure, when making burned firebricks, to fire these bricks to temperatures in excess of the temperature for which the bricks are designed in service. In the case of burned magnesite brick, failure occurs in this type of test approximately 45° F. below the melting point of liquids which form. Similar failure occurs in cases of fireclay and silica brick.

Our magnesia-zircon refractories exhibit an entirely different behavior as shown in Table II.

TABLE II

| Initial Firing Temperature, °F. | Temperature of Failure on Hot Load Test, °F. |
| --- | --- |
| 265 | 2,192 |
| 800 | 2,200 |
| 1,600 | 2,200 |
| 2,300 | 2,436 |
| 2,900 | (*) |

*No failure when exposed to 2,640° F. (maximum temperature obtainable in standard hot load furnace) for 1½ hours. Failure temperature is thus undetermined, but may be approximated at 2,900° F. or higher because X-ray data shows that no oxides present in significant had melting points under 3,400° F. This refractory withstands temperatures in excess of 3,100° F. in actual use in ladles and in furnaces. However, precise loading under these conditions of use is indeterminate.

All bricks referred to in Table II which had been fired to temperatures in the neighborhood of 2300° F. exhibited a structure which gave visual evidence of formation and solidification of a liquid. However, X-ray analysis of magnesia-zircon brick which had been fired to higher temperatures showed than an unidentified mineral had disappeared and that the only phases left were forsterite, cubic zirconia and periclase. The lowest melting point of any of these three substances is 3400° F.

We believe we have discovered a new principal of bonding because in order for these end products to form leaving no zircon, the zircon must have dissociated. Heretofore, it has been necessary to heat zircon to temperatures well in excess of 3200° F. before even a small amount of dissociation takes place. In fact, standard references do not mention dissociation at all, but simply give the melting point of zircon as 4612° F.

This it is possible to develop strong high temperature bonds in our magnesia-zircon refractories by heating them to intermediate temperatures (above about 2000° F.) only. It should be obvious that this is a unique and useful property, not only for the manufacture of brick and other shapes for high temperature service, but also for rammed, cast or gunned-in-place furnace linings. In this latter case, bonds capable of withstanding high temperatures are thereby developed a substantial distance behind the hot exposed surfaces at temperatures which are of necessity lower than that of those at the exposed surface. Thus, a troublesome plane of weakness characteristic of other chemically bonded refractories does not exist a short distance behind the exposed face of our magnesia-zircon refractories which have been cured in place for a reasonable length of time.

Similar favorable reactions take place with comparable refractories made with lime, lime and magnesia, dolomite or other basic refractory oxides. We recognize that where substantial amounts of lime are present, it is necessary to add a small amount of a stabilizer, such as an oxide of iron, chromium, or boron to prevent inversion of dicalcium silicate which is likely to form.

TABLE III

| Percent MgO | Percent Zircon | Phases Present After Cooling From 2,732° F. | |
| --- | --- | --- | --- |
| | | After 1st 4-hr. firing | After 2nd 4-hr. firing |
| 10 | 90 | Forsterite, zircon monoclinic zirconia. | Enstatite, zircon, monoclinic zirconia. |
| 20 | 80 | Forsterite, zircon, monoclinic zirconia. | Enstatite, zircon, monoclinic zirconia. |
| 30 | 70 | Forsterite, monoclinic zirconia. | Forsterite, monoclinic zirconia. |
| 40 | 60 | Forsterite, magnesia, cubic zirconia. | Forsterite, magnesia, cubic zirconia. |
| 50 | 50 | Forsterite, magnesia, cubic zirconia. | Forsterite, magnesia, cubic zirconia. |
| 60 | 40 | Forsterite, magnesia, cubic zirconia. | Forsterite, magnesia, cubic zirconia. |
| 70 | 30 | Forsterite, magnesia, cubic zirconia. | Forsterite, magnesia, cubic zirconia. |
| 80 | 20 | Forsterite, magnesia, cubic zirconia. | Forsterite, magnesia, cubic zirconia. |
| 90 | 10 | Forsterite, magnesia, cubic zirconia. | Forsterite, magnesia, cubic zirconia. |

Table III shows results of X-ray analysis of 1″ x 1″ x 6″ bars made with various percentages of finely ground high purity magnesite and zircon and fired to 2732° F. for four hours, then refired to the same temperature for four hours to determine if all phases present were stable.

It should be noted that the cubic (high temperature form) of zirconia is stable above 1832° F., whereas the monoclinic form is stable below this temperature. A volume change accompanies the shift which occurs during cooling from cubic to monoclinic and this change of volume is sufficient to produce severe spalling in massive refractory structures made from $ZrO_2$ or zircon refractories which have been heated to high enough temperatures to develop a significant amount of $ZrO_2$ by dissociation of the zircon. It is well known that the presence of several basic oxides (such as magnesia, lime and hafnia) in a matrix of cubic zirconia will stabilize this allotropic form so that it can exist at room temperatures. Thus, in our magnesia-zircon refractories, when formulated so that an excess of magnesia is present over what is required to convert all of the silica in the refractory (including that derived from the dissociation of zircon) to forsterite

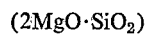

$(2MgO \cdot SiO_2)$ substantially all of the zirconia ($ZrO_2$) which may form during heating is stabilized (by the excess magnesia) in the cubic allotrope. Not only do our X-ray studies confirm this, but our heating and cooling tests designed to uncover spalling or rapid changes in volume caused by the allotropic changes in zirconia have failed to produce this spalling. A ratio of MgO to zircon of approximately 40:60 (between 30:70 and 40:60) or greater is necessary to produce this advantage of the invention.

Another severe test for this thermal stability occurs when zircon containing refractories are employed as rammed or cast-in-place linings for high frequency induction furnaces used for steel melting. At the finish of such a heat of steel, the temperature of the molten metal may be 3000° F. or higher. Two or three inches from the location of this high temperature, and surrounding the refractory lining which contains the molten metal, is an induction cell made from copper tubing through which cold water is circulated. As soon as the molten metal is poured from the furnace, the refractory linging is rapidly cooled by conduction of heat into the cold water. If any substantial amount of unstabilized $ZrO_2$ were present, severe longitudinal cracks would appear and do appear in linings made from zircon refractories where no provision has been made for stabilization of any zirconia which may form upon prolonged heating. Our magnesia-zircon refractories perform extremely well in this service; and, in particular, induction furnace linings made from them do not develop longitudinal cracks.

With minor modifications, which could be made by those familiar with this art, any one or several basic refractory oxides could be used in place of magnesia.

Although many bonding chemicals may be used with zircon to make refractory bodies of satisfactory green strength, alkaline or alkyl silicates are particularly suited for this purpose. Were it not for the fact that strength is maintained only to the melting point of the silicates, such compounds might be considered ideal. For instance, we have found that refractories made entirely with magnesite and bonded with 3% of sodium silicate exhibit cold flexural strengths, as measured by loading between two supported points (modulus of rupture ASTM Designation C-268-61T), in the range of 1000 to 2000 p.s.i. Zircon and magnesia-zircon refractories, including those made with substantial amounts (up to 70%) of magnesia, the rest being essentially zircon which is finer than 50 mesh (bonded with 3% of the same sodium silicate) exhibit cold flexural strengths in the range of 3000 to 6000 p.s.i.

Bonding or fluxing agents suitable for use in the present invention, other than alkaline or alkyl silicates, include cullet, borates, plastic clays, bentonite, mineral or organic acids or the salts of esters of such acids, spent paper pulping liquors or the dry residue produced from such liquors, exothermic bonding agents, and others. These may be added singly or in combination to the mixtures of deadburned magnesite and/or dolomite and/or refractory lime and zircon. Also, other refractory constituents such as finely comminuted magnesia or magnesium hydroxide, zirconia, hafnia, thoria, chromite, chromic oxide, chromates in various forms, alumina, clays or fireclays, sillimanite or kyanite, porcelains, magnesia-alumina spinel, and a variety of oxides, borides, silicides, hydrides, carbides and nitrides may be added singly or in combination in minor amounts to the mixtures of dead-burned magnesite and/or dolomite and/or lime and zircon.

Since refractories used to form linings for furnaces or ladles are generally heated to high temperatures only on their hot or exposed faces, stronger structures in the refractory behind these exposed faces are extremely useful in helping to preserve structural integrity of the furnace or ladle lining. Such linings are subjected to large stresses brought about by rapid changes of temperature of the hot faces, mechanical shock resulting from charging heavy solid or liquid materials into the furnace or ladle, and cyclic or progressive movement of the metal structure of the furnace or ladle or other structure during use.

Another aspect of the present invention involves the making of refractory articles having a permanent, predetermined linear expansion made from magnesite of 90% or higher purity and zircon. For example, a mixture containing 60 parts by weight of finely comminuted zircon and 40 parts by weight of magnesite of less than 140 mesh size which contains approximately 95% MgO and bonded with approximately two parts by weight of a dried sodium lignin sulfite is mixed with sufficient water to produce satisfactory compaction. This mixture is rammed, cast, or pressed into compacts of convenient size, such as 1″ x 1″ x 6″. The compacts are then dried at 265° F. to develop initial strength, and then are heated to temperatures in excess of 2300° F. (2732° F., for example), and held at this temperature for a period of time which depends upon the size of the compacts. For the 1″ x 1″ x 6″ sample of this example 8 hours are sufficient.

Table IV, Test Series A, shows that the 60:40 mix exhibits a permanent linear expansion during firing, whereas other mixes exhibit permanent linear contraction under like conditions.

TABLE IV.—PERMANENT LINEAR EXPANSION (−) AND CONTRACTION (+) OF MAGNESIA-ZIRCONIA REFRACTORIES

[Test Series A: Small Compacts Made From Fine Magnesite Plus Fine Zircon]

| Percent MgO −140 Mesh | Percent $ZrSiO_4$ −140 Mesh | Percent Permanent Linear Change After Cooling, Firing Temp. 2,732° F., 8 hr. at temp. |
|---|---|---|
| 0 | 100 | |
| 10 | 90 | +1.2 |
| 20 | 80 | |
| 30 | 70 | +2.44 |
| 40 | 60 | −1.29 |
| 50 | 50 | +3.30 |
| 60 | 40 | +8.05 |
| 70 | 30 | +9.24 |
| 80 | 20 | |
| 90 | 10 | +11.30 |
| 100 | 0 | |

[Test Series B: 2″ x 2″ x 9″ Bricks Made According to Example in This Application Fired to Various Temperatures For Five Hours at Temperature]

| Firing Temperature, ° F. | Percent Permanent Linear Change After Cooling |
|---|---|
| 750 | −0.13 |
| 1,600 | −0.56 |
| 2,300 | −0.69 |
| 2,900 | −2.44 |

Test Series B of Table IV shows results when bricks made according to the example of the present application are fired at various temperatures. The ratio of magnesia to zircon in this example is 64:36. However, much of the zircon is of a size greater than 20 mesh which is relatively unreactive insofar as the expansion properties are concerned. Therefore, while the overall composition contains a substantial amount of magnesia (so that the particle sizes of the ingredients are arranged to form a strong dense tightly packed article), the ratio of magnesia of less than 20 mesh to zircon of less than 50 mesh is still in the neighborhood of 40:60 or from 35:65 and 45:55. As may be seen from Test Series A of Table IV, it is this ratio of fine ingredients which produces a composition having a permanent linear expansion after firing. Since it is the fine particles of magnesia and zircon which enter into the reaction and determine the relative expansion or contraction of the final article, it is apparent that the amount of the different fines can be determined from Test Series A and correlated with the necessity for having a substantial amount of large particles of magnesia to give the article strength to arrive at a composition of various mesh sizes which will have the desired expansion or contraction properties.

This slight permanent expansion we have found also occurs when these magnesia and zircon refractories are placed in service in such applications as linings for steel ladles or linings for high frequency induction furnaces. In these applications, the expansion prevents the formation of radial cracks, or apparently "heals" such cracks if they do actually form in service. Such cracks caused generally by permanent shrinkage is a major cause of failure of refractories made from other materials. It will be readily appreciated that a slight expansion of a cylindrical or other closed surface type lining which is backed up by a strong shell such as one made from steel plate would result in expanding the lining tightly against the shell and minimizing the formation of radial cracks and "shrinkage spalls."

By varying the amounts of magnesite and zircon in the mixtures, various degrees of permanent linear expansion may be obtained and, in fact, mixtures which exhibit neither expansion nor contraction may be made. By varying the grade of magnesite, by using different sizings (finer sizes are more reactive) of magnesite and zircon and changing the amounts and identities of the bonding agents, further control over the expansion or contraction of any particular mixture of magnesia and zircon can be obtained. Such control may be desirable in applications where linings are not of the closed curve type or for use in manufacturing brick or other shapes used for construction of objects where permanent changes in dimensions may have critical results or in unforeseen applications where increase, decrease or stable dimensions of a refractory body or structure may result in valuable effects.

In forming refractory bodies by ramming, the composition preferably contains a substantial fraction of coarse grains, such as 30–70% by weight of the material being of a size that would pass a U.S. 6 mesh sieve and be retained on a U.S. 70 mesh sieve. The balance of the composition, if composed essentially of fine-grained material, such as would pass through a U.S. 70 mesh sieve, would contain a broad range of particle sizes, some of which may be considered infinitesimal. This combination is advantageous in that blows of the rammer are transmitted below the surface by the coarse grains which also tend to bounce around on the rammed surface. This tends to promote uniform density throughout the rammed mass and when ramming a plurality of layers in place, as is common practice, laminations at the rammed surface are minimized. This is in contrast to emplacement by ramming of a finely comminuted mass which tends to "gloss over" or become slick on the rammed surface, after which consolidation below the surface becomes excessively time consuming or even impossible. Subsequent layers will not readily adhere to such slick surfaces and laminations result. Subsequent stresses will cause failure along such laminated planes and it is well known in the art that these should be avoided wherever possible.

Another unique property of our magnesia and zircon refractories is that they are virtually hydration proof under normal conditions of use and storage. No refractory designed for service in contact with basic slag may be packaged, premixed with water and stored for more than a very few days without deterioration. We believe the reason that no serious loss of strength occurs in our magnesia-zircon refractories is that a substantial portion of the magnesia is present as coarse grains.

Table V shows the results of compositions mixed with water, packaged in a polyethylene bag, and stored for various periods of time before use.

TABLE V

*Loss of strength of wet-stored magnesia-zircon refractories*

The samples are broken to determine modulus of rupture on 7 inch centers. The samples are rammed into 2" x 2" x 9" bars, allowed to harden for 24 hours, dried at 265° F. for five (5) hours, and cooled to room temperature before breaking. Each value reported is the average for five bars.

Percent
(A) Coarse MgO+zircon (U.S. Standard Sieve):
  5 x 20 mesh 97% MgO _____ 50
  70 x 270 mesh zircon _____ 20
  Minus 140 mesh zircon _____ 27
  Hydrated sodium silicate powder _____ 3

3½% by weight of water is admixed and the composition is stored in a polyethylene bag.

Modulus of rupture of bar: P.s.i.
  Rammed immediately after mixing with water _ 4550
  Rammed one month after mixing with water __ 4528
  Rammed two months after mixing with water _ 3619
  Rammed four months after mixing with water _ 3046
  Rammed eight months after mixing with water _____ 3046

(B) Fine MgO+zircon (U.S. Standard Sieve): Percent
  10 x 70 mesh 97% MgO _____ 50
  70 x 270 mesh zircon _____ 20
  Minus 140 mesh zircon _____ 27
  Hydrated sodium silicate powder _____ 3

3½% by weight of water is admixed and the composition is stored in a waterproof airtight polyethylene bag.

Modulus of rupture of bar: P.s.i.
  Rammed immediately after mixing with water _ 4634
  Rammed one month after mixing with water __ 4244
  Rammed two months after mixing with water _ 3842
  Rammed four months after mixing with water _ 4012

We have also found that a small amount of fine (minus U.S. 70 mesh) magnesite or magnesium hydroxide in the order of a few percent (usually less than ten percent) tends to decrease the time and temperature needed for full chemical maturation. This small amount of magnesia or magnesium hydroxide does not harm the wet storage properties.

In our magnesite and zircon mixes, we use magnesite that is coarse enough to be retained on a U.S. 70 mesh sieve and preferably a substantial part of it should be of a size that is retained on a U.S. 20 mesh sieve, the top size being as coarse as the particular application will permit, ⅜", ¾" or even 1" and larger particles of magnesite might be incorporated. The zircon which is economically available in quantity is of a size of which essentially all of it will pass through a U.S. 70 mesh sieve. Since satisfactory coarser particles of zircon are prohibitively expensive, the use of coarse magnesite as described herein can provide a satisfactory granular refractory with good ramming qualities. Coarse particles are also needed for successful pneumatic emplacement through the usual type of pneumatic refractory gun. It will be readily recognized that coarse particles of magnesite in our magnesite-zircon refractories provide the coarse particles needed for this application, too.

It is the purpose of this invention to include, where applicable, refractories made from various other basic refractory grains beside magnesite containing 97% MgO. It will be recognized that high purity magnesite whose magnesia content may approach even closer to 100% also may be used for certain applications described herein and also lower grades of magnesite and mixtures of magnesite and dead-burned refractory dolomite or such dolomite alone may be used in certain applications. Many different bonding agents, mineralizers, fillers and other materials of many varieties may also be added without changing the fundamental concepts described herein.

The following is an example of refractories made according to this invention.

*Example*

From commercially produced crushed dead-burned magnesite grains we screen out two fractions, i.e., those grains which will essentially all pass through a U.S. 5 mesh screen and be retained on a U.S. 20 mesh screen (5 x 20 m.) and those grains which will pass a U.S. 20 mesh sieve and be retained on a U.S. 70 mesh sieve (20 x 70 m.). We obtain purified zircon ore of a size of which essentially all will pass through a U.S. 70 mesh sieve and be retained on a U.S. 270 mesh sieve (70 x 270 m.). Part of this zircon ore is milled so that essentially all of it will pass through a U.S. 140 mesh sieve (−140 m.). We also obtain a powdered hydrated sodium silicate, preferably of a relatively soluble type with a ratio of soda to silica of 1:2.00.

Minor amounts of other substances may or may not be added to develop specific ancillary properties. Examples of such substances are wetting agents to promote mixability, alkaline carbonates to promote greater strength and to inhibit bond migration, one or more of several organic soluble polymers to produce certain rheological characteristics in the moistened mass, borates to influence sinterability or chemical reactivity of the refractory grains, chemical "wicks" to promote ease of drying, or other substances which may be desirable, considering the particular application for the refractory.

Omitting the minor amounts of these specific substances, which generally would constitute less than 1% of the mass individually and less than 2% totally and which for many applications may not be needed at all, a satisfactory formulation is as follows:

|  | Percent |
|---|---|
| U.S. 5 x 20 mesh magnesite, 97% MgO grade | 44.6 |
| U.S. 20 x 70 mesh magnesite, 97% MgO grade | 17.5 |
| U.S. 70 x 270 mesh zircon (or MgO, or MgO as MgOH) | 5.8 |
| U.S. −140 mesh zircon | 29.1 |
| Powdered hydrated sodium silicate, $SiO_2/Na_2O = 2.00/1.00$ | 3.0 |

The ingredients are blended dry and thoroughly mixed in an intensive mixer. The sodium silicate may be mixed with the zircon and milled with it, and this mixture then blended with the magnesite and the remainder of the zircon. The blended ingredients are packaged dry or, three to four percent water may be added during or after blending and the resulting tempered product packaged in air-tight containers for subsequent use.

A mixture of this type gives equal or longer life than magnesite or straight zircon refractories when used for such diverse purposes as lining steel ladles, lining high frequency induction furnaces and lining electric furnace spouts. This same formulation gives far better service in place of magnesite or fireclay or fireclay plus graphite or high alumina refractories when used for packing ladle nozzles or forming bottoms in large steel ladles. Furthermore, it has been shown that because of lesser wear rate, harmful inclusions in molten metal which has come in contact with our magnesia and zircon refractories are substantially reduced in number.

This refractory may be pressed, cast, rammed, vibrated, or otherwise consolidated into bricks and refractory shapes, bonded with acids or salts or substances promoting sintering. It may be produced as chemically bonded bricks or shapes or as a fired brick or shape, one advantage in the case of fired brick or shapes being that firing temperatures to produce satisfactory hot strength need not be nearly so high as those needed for other types of refractory brick.

Magnesia and zircon brick also can be made without the use of a chemical bond by forming and heating to temperatures as low as 2000 to 2500° F. These bricks or shapes are particularly resistant to thermal spalling and to mechanical shock in service as compared to ordinary basic brick. They also have a comparable order of resistance to basic slags, but do not exhibit the destructive growth in presence of iron oxide nor the destructive shrinkage when heated in iron oxide-free environment as do ordinary magnesite brick. As compared to brick made with substantially all fine zircon, they have inherently higher hot load strength and are superior in spall resistance in service. These brick resist attack by molten acid slags better than ordinary basic brick, because the fine fraction is zircon, and the coarse magnesite or other basic oxide fraction tends to form protective coatings of refractory silicates when exposed to basic slags.

Thus, it is seen that the present invention provides a refractory having all of the objects and advantages sought therefor. The present refractory composition includes mixtures of about 40–90% coarse magnesite or other basic refractory, (a major portion of which is of greater than 20 mesh), about 60–10% fine zircon, and may include other minor constituents added for bonding or other purposes. These mixes may be packaged in a moistened condition in air-tight containers for extended periods of time without substantial harm to the refractory caused by hydration of the magnesia.

This invention is intended to cover all changes and modifications of the examples of the invention herein chosen for purposes of the disclosure, which do not constitute departures from the spirit and scope of the invention.

What is claimed is:

1. A refractory composition consisting essentially of
   (a) from about 40% to about 90% basic refractory component of grain size from about U.S. 70 mesh to about 1 inch, and
   (b) from about 60% to about 10% zircon of grain size smaller than 50 mesh.

2. The composition of claim 1 wherein the basic refractory includes a major proportion of greater than 20 mesh.

3. The composition of claim 2 wherein the basic refractory component is about 97% MgO and said composition includes about 3% to about 5% water, said composition being packaged in a waterproof substantially air-tight container and being highly resistant to destructive hydration.

4. The composition of claim 2 wherein the basic refractory is essentially magnesite.

5. The composition of claim 2 including up to about 5% of a silicate bonding agent, said composition having both good cold strength and good hot load strength.

6. The composition of claim 4 including less than 10% of −70 mesh magnesium containing material.

7. A composition having a higher hot working strength according to ASTM C–16–49 after firing at temperatures of greater than about 2000° F. consisting essentially of
   (a) about 40–90% magnesia of grain size from about U.S. 70 mesh to about 1 inch with a major portion being of greater than U.S. 20 mesh,
   (b) and 60–10% of zircon of less than U.S. 50 mesh,
   (c) said composition being fired at temperatures of above about 2000° F. and developing bonds which withstand subsequent firing and bonding according to ASTM C–16–49 at temperatures up to 100° F. or more above the initial firing temperature.

8. A composition having a limited permanent linear expansion when fired consisting essentially of
   (a) 40–90% of a magnesite portion of grain size from about 70 mesh to about 1 inch,
   (b) and 60–10% of a zircon portion of less than 50 mesh,
   (c) the ratio of magnesite of less than 20 mesh to zircon being between about 35–65 and about 45–55.

9. A composition suitable for ramming application consisting essentially of
   (a) 40–90% of a magnesite portion of grain size greater than 70 mesh and less than about 1 inch
   (b) 60–10% of a zircon portion of less than 50 mesh,
   (c) from 30–70% of said composition being of greater than 20 mesh.

10. A method of packaging in wet, ready to use form a refractory composition which is resistant to attack by molten acidic and basic slags and oxidizing and reducing slags at high temperatures, has good cold and hot strength including the steps of
    (a) blending from about 40%–90% of a basic refractory of grain size such that essentially all of the grains are retained on a U.S. 70 mesh screen and pass about a 1 inch screen and a substantial portion is retained on a U.S. 20 mesh screen, said grain being about 97% MgO with
    (b) about 60%–10% of zircon of a grain size that substantially all passes through U.S. 50 mesh screen, (c) and a minor amount of water on the order of about 3-4%,
(d) and packaging the composition in a waterproof, substantially air-tight container.

11. The method of claim 10 wherein the container is polyethylene.

12. The process of claim 11 including the step of adding up to 5% silicate bonding agent.

13. A refractory composition comprising
(a) about 45% U.S. 6 x 20 mesh magnesite,
(b) about 18% U.S. 20 x 70 mesh magnesite,
(c) about 6% U.S. 70 x 270 mesh zircon,
(d) about 29% U.S. —140 mesh zircon, and
(e) about 3% sodium silicate.

14. A refractory composition comprising
(a) about 45% U.S. 6 x 20 mesh magnesite,
(b) about 18% U.S. 20 x 70 mesh magnesite,
(c) 6% U.S. 70 x 270 mesh MgO equivalent,
(d) about 29% U.S. —140 mesh zircon, and
(e) about 3% sodium silicate.

References Cited by the Examiner
UNITED STATES PATENTS

| | | | |
|---|---|---|---|
| 3,044,889 | 7/1962 | Ekedahl et al. | 106—63 |
| 3,192,059 | 6/1965 | Good et al. | 106—57 |

HELEN M. McCARTHY, *Acting Primary Examiner.*

TOBIAS E. LEVOW, *Examiner.*

J. E. POER, *Assistant Examiner.*